(12) United States Patent
Chang et al.

(10) Patent No.: US 7,591,619 B1
(45) Date of Patent: Sep. 22, 2009

(54) MACHINING APPARATUS

(75) Inventors: Paul Chang, Daya Township (TW); Tsair-Rong Chen, Hemei Township (TW); Jeen-Sheen Row, Mialoi (TW); Yuan-Fu Tsai, Daya Township (TW)

(73) Assignees: Buffalo Machinery Co., Ltd., Daya Township, Taichung County (TW); The Department of ElectricalEngineering, National Chang-Hua University of Education, Changhua, Changhua Count (TW)

( * ) Notice: Subject to any disclaimer, the term of this patent is extended or adjusted under 35 U.S.C. 154(b) by 0 days.

(21) Appl. No.: 12/060,460

(22) Filed: Apr. 1, 2008

(51) Int. Cl.
*B23C 1/06* (2006.01)
(52) U.S. Cl. .................. 409/212; 409/235; 409/158
(58) Field of Classification Search .............. 409/158, 409/202, 212, 235; 408/43, 46, 53, 70, 234; 29/33 P, 563
See application file for complete search history.

(56) References Cited

U.S. PATENT DOCUMENTS

| | | | | |
|---|---|---|---|---|
| 4,984,351 A | * | 1/1991 | Matsuyama et al. ............ 483/4 |
| 4,999,895 A | * | 3/1991 | Hirose et al. ................ 29/33 P |
| 5,323,821 A | * | 6/1994 | Suzuki ....................... 144/48.1 |
| 5,429,461 A | * | 7/1995 | Mukherjee et al. ........... 409/163 |
| 5,468,101 A | * | 11/1995 | Shoda ........................ 409/202 |
| 5,980,172 A | * | 11/1999 | Shoda ........................ 409/203 |
| 6,193,048 B1 | * | 2/2001 | Keith ....................... 198/346.1 |
| 6,623,219 B2 | * | 9/2003 | Nagasawa et al. ........... 409/212 |
| 2007/0206997 A1 | * | 9/2007 | Onsrud ....................... 409/202 |

FOREIGN PATENT DOCUMENTS

| | | | |
|---|---|---|---|
| DE | 3238197 C1 | * | 5/1984 |
| JP | 53-020182 A | * | 2/1978 |
| JP | 59-132742 U | * | 9/1984 |
| JP | 59-201732 A | * | 11/1984 |
| SU | 1551515 A1 | * | 3/1990 |

OTHER PUBLICATIONS

Machine Translation of DE 3238197-C1.*

* cited by examiner

*Primary Examiner*—Erica E Cadugan
(74) *Attorney, Agent, or Firm*—Vedder Price P.C.

(57) ABSTRACT

A machining apparatus includes a support frame, first and second workbenches, and a tool-mounting unit. The support frame includes a first horizontal frame part, and a second horizontal frame part disposed above the first horizontal frame part. The first and second workbenches are mounted slidably on the first horizontal frame part of the support frame, and is slidable relative to the support frame in a first horizontal direction. The tool-mounting unit is mounted slidably on the second horizontal frame part of the support frame, and is slidable relative to the support frame in a second horizontal direction transverse to the first horizontal direction.

3 Claims, 8 Drawing Sheets

MACHINING APPARATUS

BACKGROUND OF THE INVENTION

1. Field of the Invention

This invention relates to a machining apparatus, more particularly to a relatively efficient machining apparatus.

2. Description of the Related Art

FIG. 1 illustrates a conventional machining apparatus 10 that includes a support frame 11, a workbench 14, a tool-mounting unit 19, and first and second operable units 13, 16. The support frame 11 includes a first horizontal frame part 12, and a second horizontal frame part 15 disposed above the first horizontal frame part 12 thereof. The workbench 14 is mounted slidably on the first horizontal frame part 12 of the support frame 11, and is slidable relative to the support frame 11 in a first horizontal direction (X). The first operable unit 13 is mounted on the first horizontal frame part 12 of the support frame 11, is coupled to the workbench 14, and is operable so as to move the workbench 14 in the first horizontal direction (X). The tool-mounting unit 19, which holds a tool bit (not shown), is mounted slidably on the second horizontal frame part 15 of the support frame 11, and is slidable relative to the support frame 11 in a second horizontal direction (Y) transverse to the first horizontal direction (X). The second operable unit 16 is mounted on the second horizontal frame part 15 of the support frame 11, is coupled to the tool-mounting unit 19, and is operable so as to move the tool-mounting unit 19 in the second horizontal direction (X).

In use, the first operable unit 13 is first operated to move the workbench 14 in the first horizontal direction (X) and to dispose the workbench 14 at a position proximate to the tool-mounting unit 19 to thereby permit the conventional machining apparatus 10 to process a workpiece 20 on the workbench 14. Thereafter, the first operable unit 13 is operated to move the workbench 14 in the first horizontal direction (X) and to dispose the workbench 14 at a position distal from the tool-mounting unit 19 to thereby permit replacement of the workpiece 20 on the workbench 14.

The aforementioned conventional machining apparatus 10 is disadvantageous in that, since it includes only one workbench 14, the conventional machining apparatus 10 is relatively inflexible and inefficient.

SUMMARY OF THE INVENTION

Therefore, the object of the present invention is to provide a machining apparatus that is relatively flexible and efficient.

According to the present invention, a machining apparatus comprises a support frame, first and second workbenches, first and second operable units, a tool-mounting unit, and a third operable unit. The support frame includes a first horizontal frame part, and a second horizontal frame part disposed above the first horizontal frame part. The first workbench is mounted slidably on the first horizontal frame part of the support frame, and is slidable relative to the support frame in a first horizontal direction. The first operable unit is mounted on the first horizontal frame part of the support frame, is coupled to the first workbench, and is operable so as to move the first workbench in the first horizontal direction. The second workbench is separated from the first workbench, is mounted slidably on the first horizontal frame part of the support frame, and is slidable relative to the support frame in the first horizontal direction. The second operable unit is mounted on the first horizontal frame part of the support frame, is coupled to the second workbench, and is operable so as to move the second workbench in the first horizontal direction. The tool-mounting unit is mounted slidably on the second horizontal frame part of the support frame, and is slidable relative to the support frame in a second horizontal direction transverse to the first horizontal direction. The third operable unit is mounted on the second horizontal frame part of the support frame, is coupled to the tool-mounting unit, and is operable so as to move the tool-mounting unit in the second horizontal direction.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
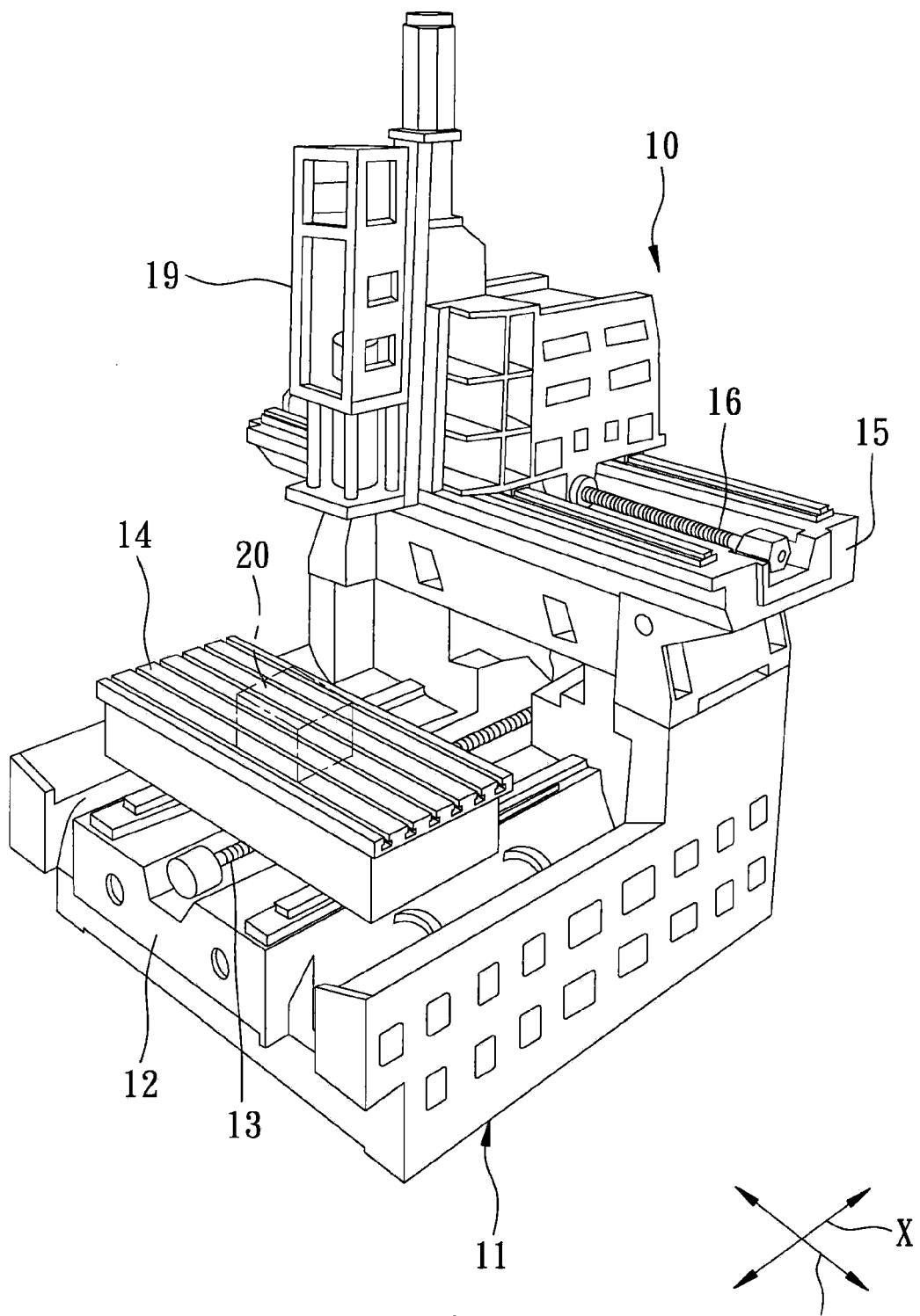
FIG. 1 is a perspective view of a conventional machining apparatus.
Figure 2:
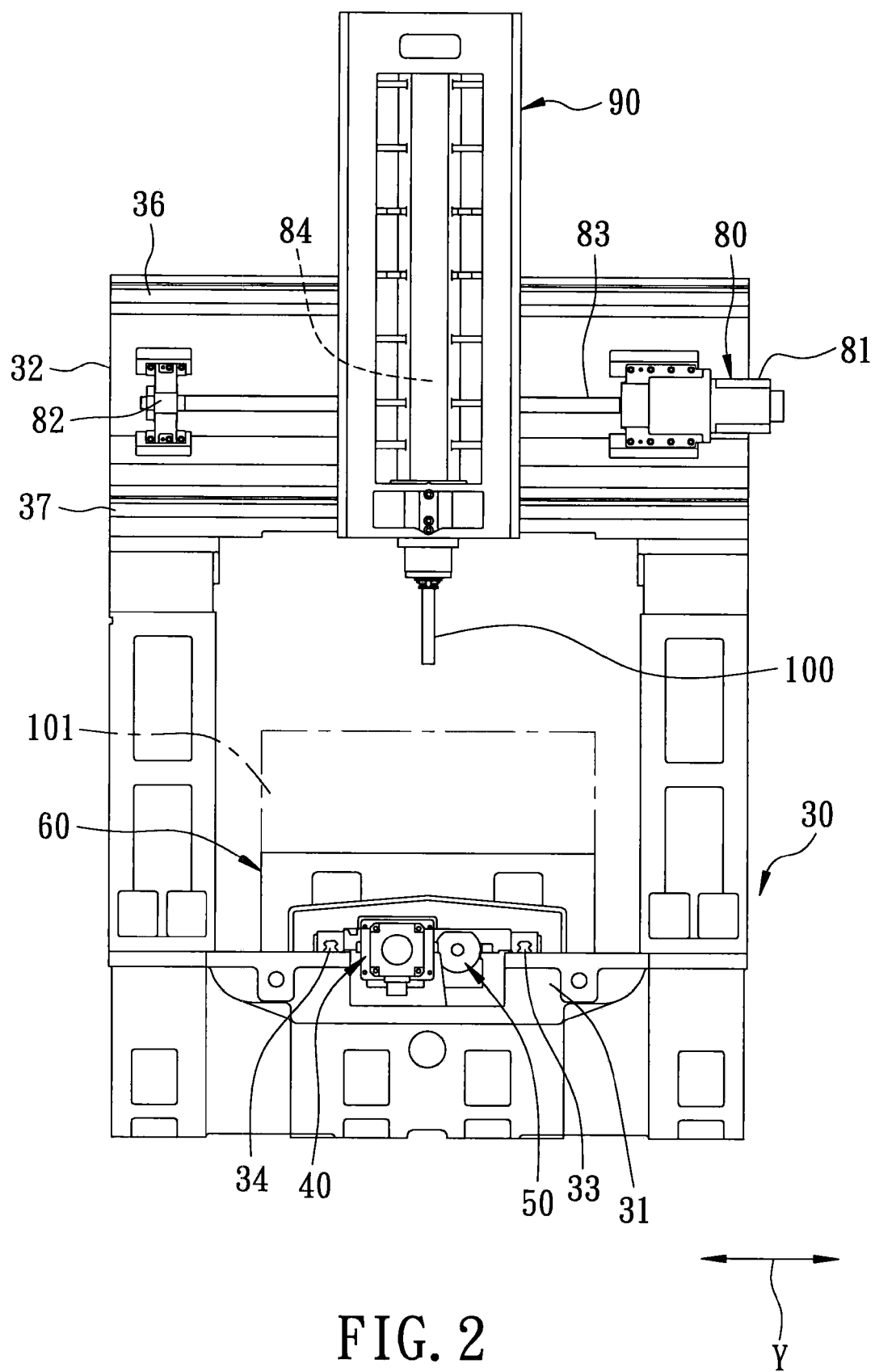
FIG. 2 is a schematic view of the preferred embodiment of a machining apparatus according to this invention.
Figure 3:
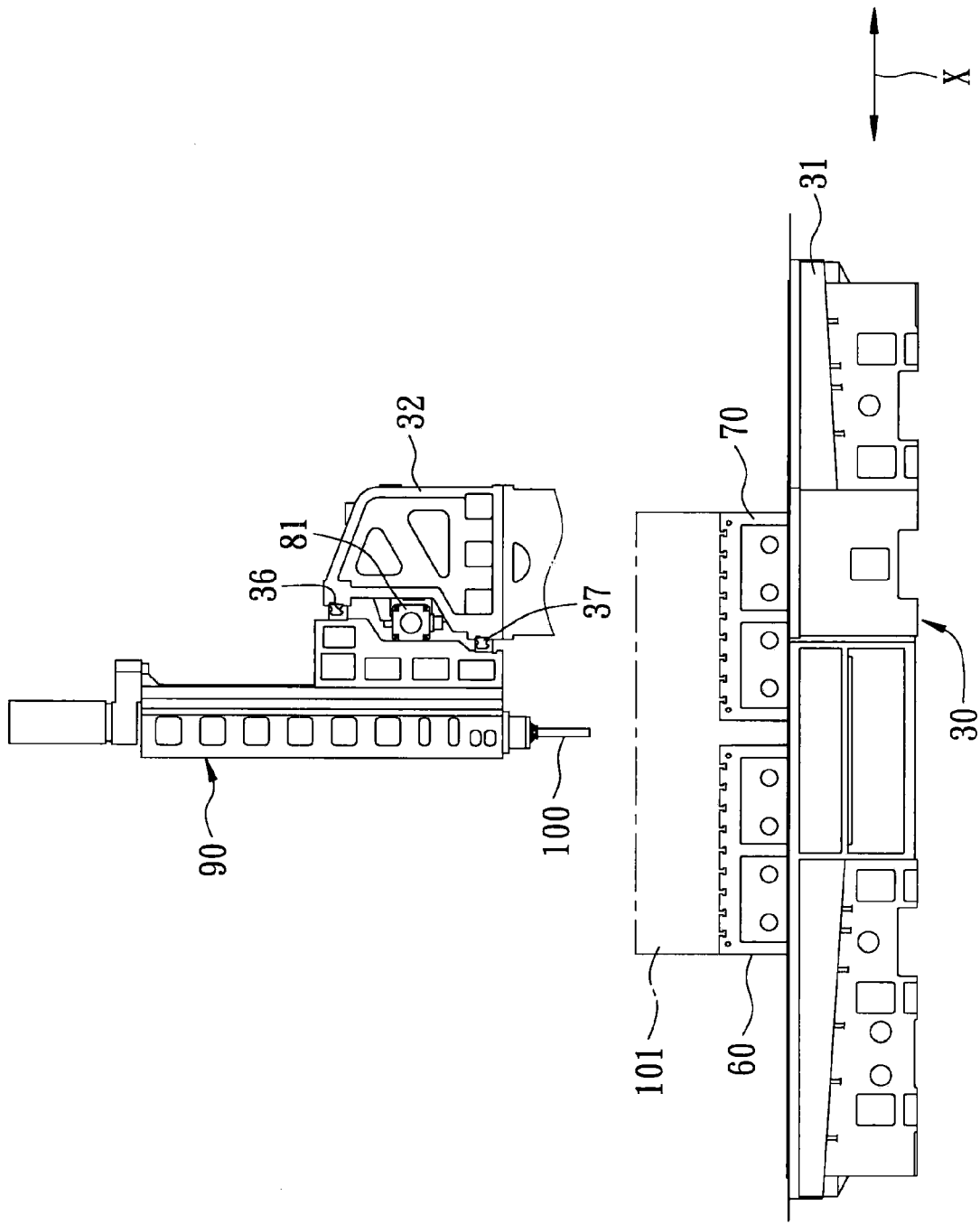
FIG. 3 is a schematic view illustrating first and second workbenches of the preferred embodiment.

Referring to FIGS. 2 and 3, the preferred embodiment of a machining apparatus according to this invention is shown to include a support frame 30, first and second workbenches 60, 70, first and second operable units 40, 50, a tool-mounting unit 90, and a third operable unit 80.

The support frame 30 includes a first horizontal frame part 31, and a second horizontal frame part 32 disposed above the first horizontal frame part 31 thereof.

The first workbench 60 is mounted slidably on the first horizontal frame part 31 of the support frame 30, and is slidable relative to the support frame 30 in a first horizontal direction (X).

The second workbench 70 is separated from the first workbench 60, is mounted slidably on the first horizontal frame part 31 of the support frame 30, and is slidable relative to the support frame 30 in the first horizontal direction (X).

The machining apparatus further includes a pair of spaced apart first and second guide rails 33, 34, each of which is mounted on the first horizontal frame part 31 of the support frame 30. Each of the first and second workbenches 60, 70 is mounted slidably on the first and second guide rails 33, 34. The construction as such permits smooth sliding of the first and second workbenches 60, 70 on the first horizontal frame part 31.

Figure 4:
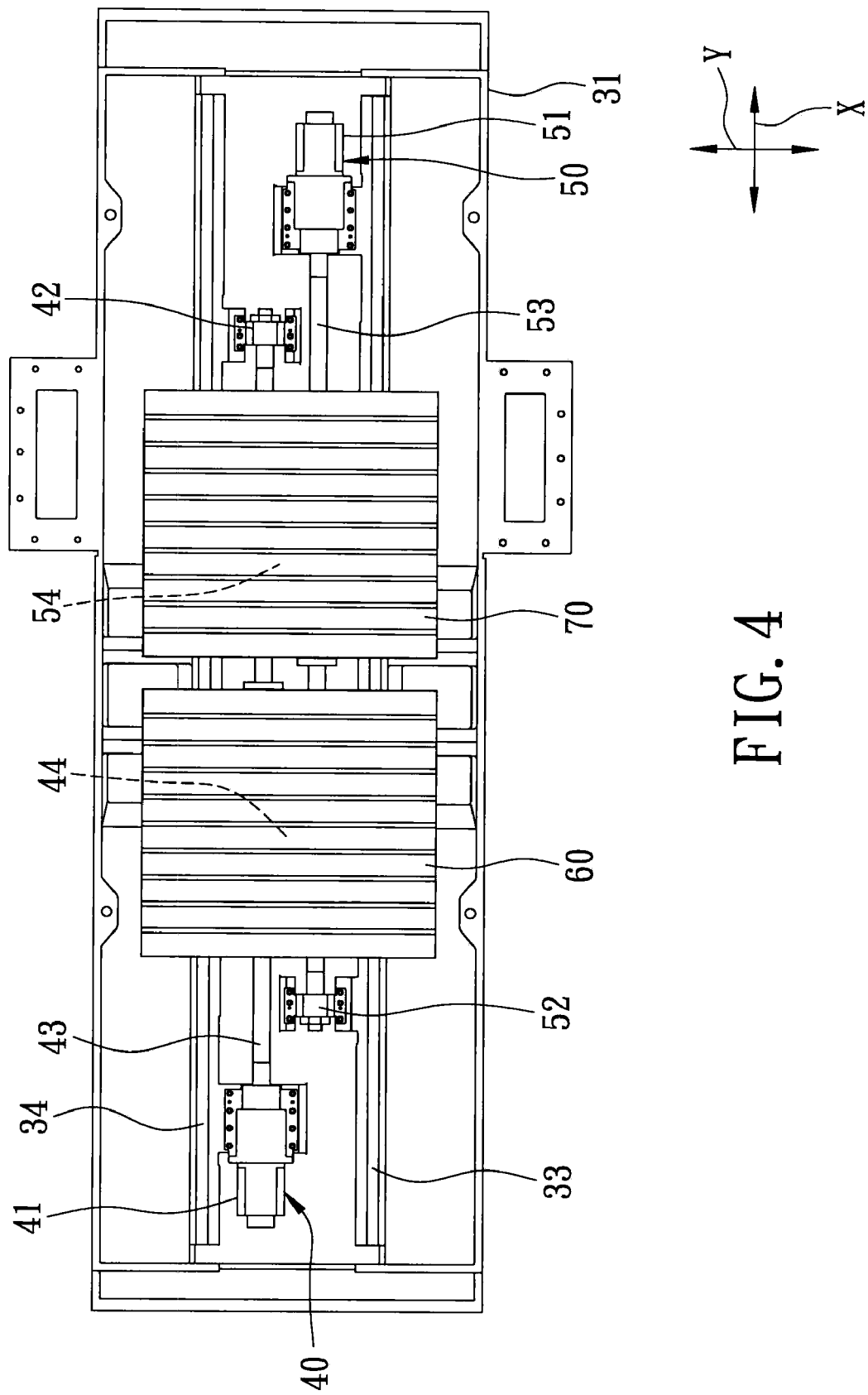
FIG. 4 is a schematic view illustrating operation of the preferred embodiment in a first mode.

With further reference to FIG. 4, the first operable unit 40 is mounted on the first horizontal frame part 31 of the support frame 30, is coupled to the first workbench 60, and is operable so as to move the first workbench 60 in the first horizontal direction (X). In particular, the first operable unit 40 includes a rotating support 42, a screw rod 43, a motor 41, and a non-rotatable mounting seat 44. The screw rod 43 of the first operable unit 40 has a first end coupled rotatably to the rotating support 42 of the first operable unit 40, and a second end opposite to the first end thereof. In this embodiment, the screw rod 43 of the first operable unit 40 is rotatable relative to the support frame 30 in opposite first and second rotational directions. The motor 41 of the first operable unit 40 is coupled to the second end of the screw rod 43 of the first operable unit 40, and is operable so as to drive rotation of the screw rod 43 in the first and second rotational directions. The mounting seat 44 of the first operable unit 40 is coupled threadedly to the screw rod 43 of the first operable unit 40. In this embodiment, the mounting seat 44 moves in the first horizontal direction (X) toward the second workbench 70 when the screw rod 43 is rotated in the first rotational direction, and away from the second workbench 70 when the screw rod 43 is rotated in the second rotational direction. The first workbench 60 is connected to the mounting seat 44 of the first operable unit 40 so as to be co-movable therewith in the first horizontal direction (X).

The second operable unit 50 is mounted on the first horizontal frame part 31 of the support frame 30, is coupled to the second workbench 70, and is operable so as to move the second workbench 70 in the first horizontal direction (X). In particular, the second operable unit 50 includes a rotating support 52, a screw rod 53, a motor 51, and a non-rotatable mounting seat 54. The screw rod 53 of the second operable unit 50 has a first end coupled rotatably to the rotating support 52 of the second operable unit 50, and a second end opposite to the first end thereof. In this embodiment, the screw rod 53 of the second operable unit 50 is rotatable relative to the support frame 30 in the first and second rotational directions. The motor 51 of the second operable unit 50 is coupled to the second end of the screw rod 53 of the second operable unit 50, and is operable so as to drive rotation of the screw rod 53 in the first and second rotational directions. The mounting seat 54 of the second operable unit 50 is coupled threadedly to the screw rod 53 of the second operable unit 50. In this embodiment, the mounting seat 54 moves in the first horizontal direction (X) toward the first workbench 60 when the screw rod 53 is rotated in the first rotational direction, and away from the first workbench 60 when the screw rod 53 is rotated in the second rotational direction. The second workbench 70 is connected to the mounting seat 54 of the second operable unit 50 so as to be co-movable therewith in the first horizontal direction (X).

The tool-mounting unit 90, which holds a tool bit 100, is mounted slidably on the second horizontal frame part 32 of the support frame 30, and is slidable relative to the support frame 30 in a second horizontal direction (Y) transverse to the first horizontal direction (X).

The machining apparatus further includes spaced apart third and fourth guide rails 36, 37. The tool-mounting unit 90 is mounted slidably on the third and fourth guide rails 36, 37. The construction as such permits smooth sliding of the tool-mounting unit 90 on the second horizontal frame part 32.

The third operable unit 80 is mounted on the second horizontal frame part 32 of the support frame 30, is coupled to the tool-mounting unit 90, and is operable so as to move the tool-mounting unit 90 in the second horizontal direction (Y). In particular, the third operable unit 80 includes a rotating support 82, a screw rod 83, a motor 81, and a non-rotatable mounting seat 84. The screw rod 83 of the third operable unit 80 has a first end coupled rotatably to the rotating support 82 of the third operable unit 80, and a second end opposite to the first end thereof. In this embodiment, the screw rod 83 of the third operable unit 80 is rotatable relative to the support frame 30 in opposite third and fourth rotational directions. The motor 81 of the third operable unit 80 is coupled to the second end of the screw rod 83 of the third operable unit 80, and is operable so as to drive rotation of the screw rod 83 in the third and fourth rotational directions. The mounting seat 84 of the third operable unit 80 is coupled threadedly to the screw rod 83 of the third operable unit 80. In this embodiment, the mounting seat 84 moves in the second horizontal direction (Y) when the screw rod 83 is rotated in the third and fourth rotational directions. The tool-mounting unit 90 is connected to the mounting seat 84 of the third operable unit 80 so as to be co-movable therewith in the second horizontal direction (Y).

In this embodiment, the rotating support 42, 52, 82 of each of the first, second, and third operable units 40, 50, 80 is in the form of a bearing.

From the above description, since the first and second operable units 40, 50 may be operated to move the first and second workbenches 60, 70 in the first horizontal direction (X) toward and away from each other, the machining apparatus of this invention may be operated in first, second, and third modes.

In the first mode, the first and second operable units 40, 50 are operated to respectively move the first and second workbenches 60, 70 in the first horizontal direction (X) to a machining position, which is proximate to the tool-mounting unit 90, as best shown in FIG. 3, thereby permitting the machining apparatus to process a workpiece 101 on the first and second workbenches 60, 70, and a replacing position, which is distal from the tool-mounting unit 90, thereby permitting replacement of the workpiece 101 on the first and second workbenches 60, 70.

Figure 5:
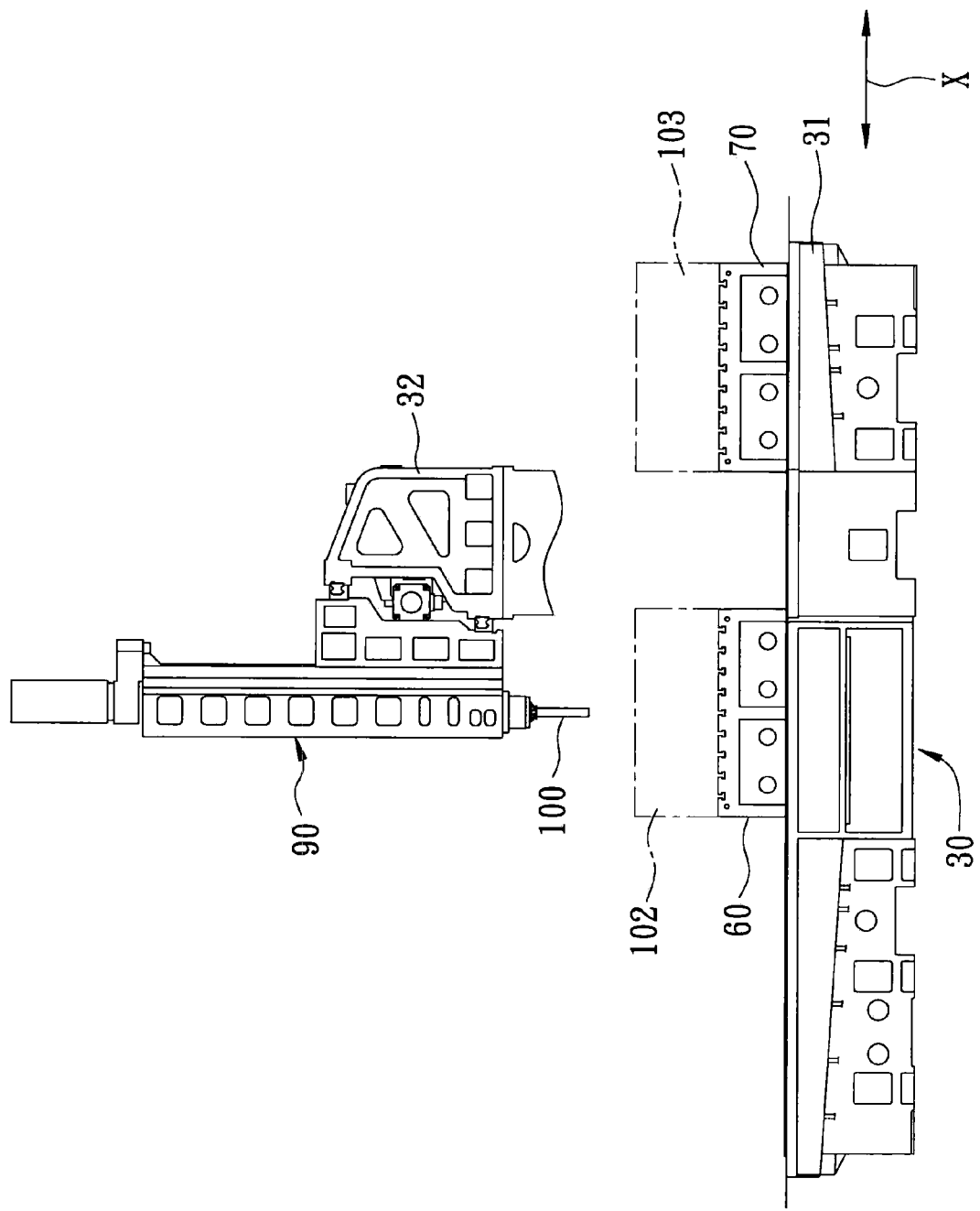
FIGS. 5 and 6 are schematic views illustrating operation of the preferred embodiment in a second mode.
Figure 6:
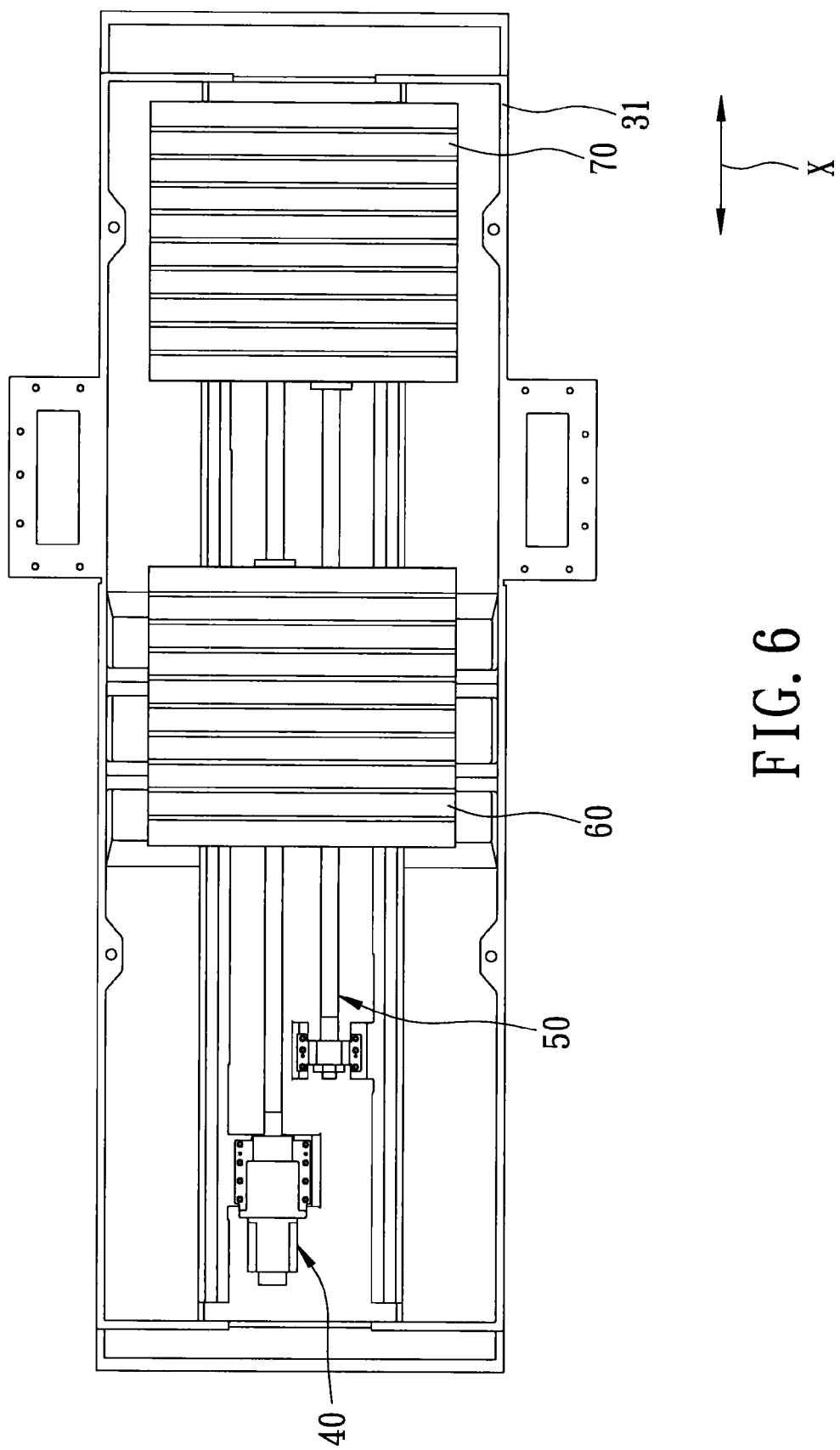

In the second mode, as best shown in FIGS. 5 and 6, the first operable unit 40 is operated to move the first workbench 60 in the first horizontal direction (X) to the machining position to thereby permit the machining apparatus to process a workpiece 102 on the first workbench 60, and the second operable unit 50 is operated to move the second workbench 70 in the first horizontal direction (X) to the replacing position to thereby permit replacement of a workpiece 103 on the second workbench 70.

Figure 7:
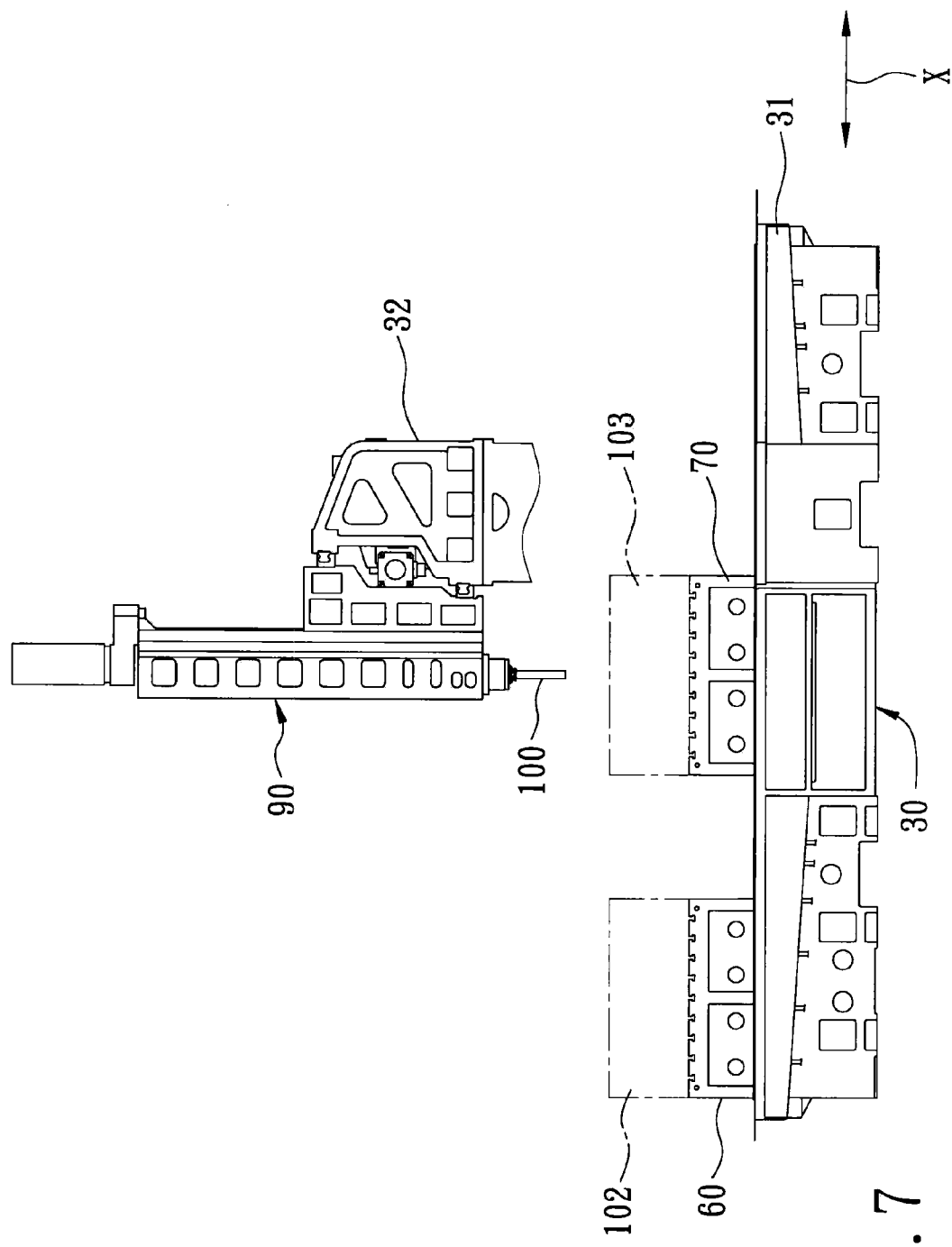
FIGS. 7 and 8 are schematic views illustrating operation of the preferred embodiment in a third mode.
Figure 8:
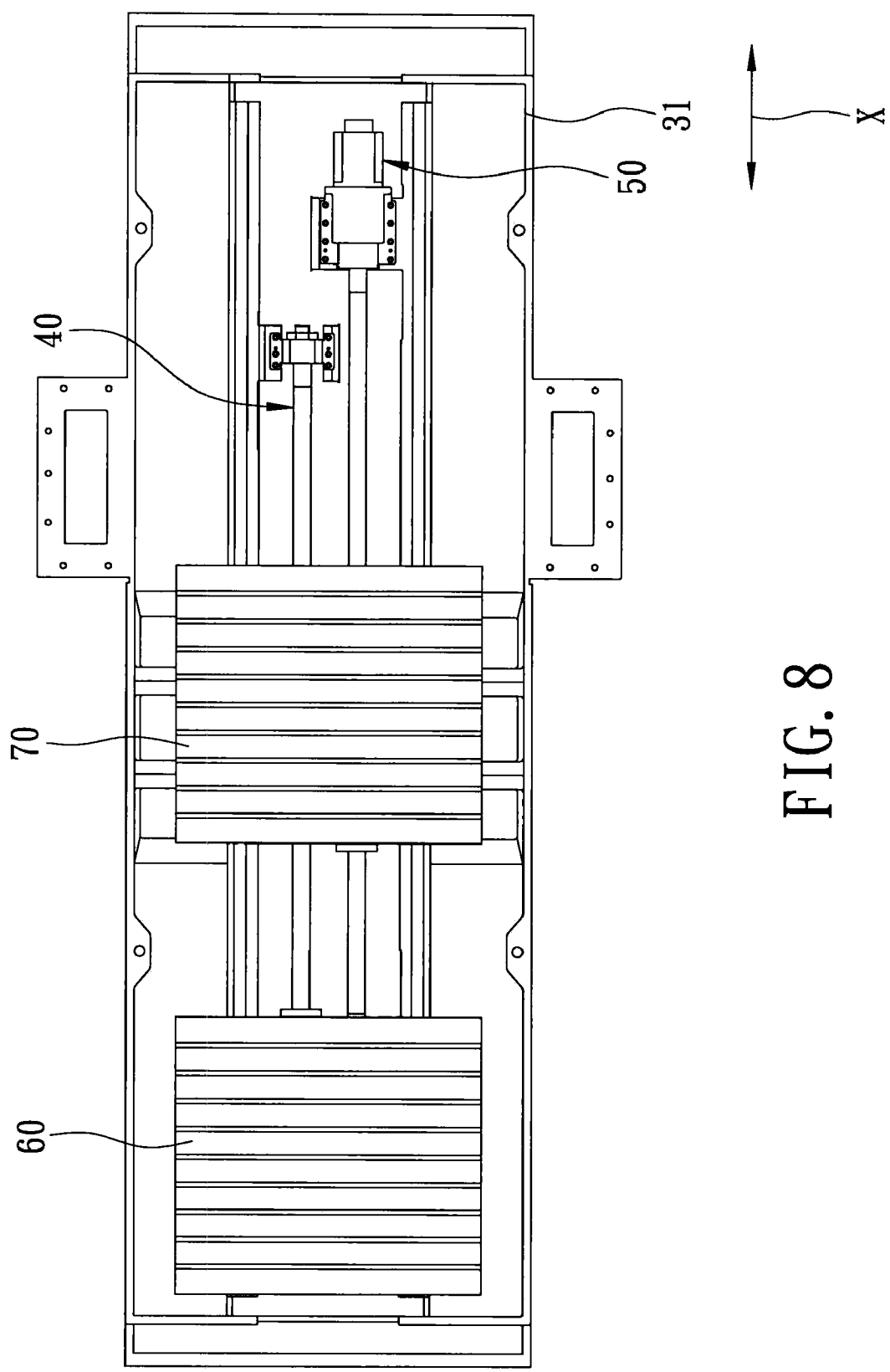

In the third mode, as best shown in FIGS. 7 and 8, the first operable unit 40 is operated to move the first workbench 60 in the first horizontal direction (X) to the replacing position to thereby permit replacement of the workpiece 102 on the first workbench 60, and the second operable unit 50 is operated to move the second workbench 70 in the first horizontal direction (X) to the machining position to thereby permit the machining apparatus to process the workpiece 103 on the second workbench 70.

It has thus been shown that the machining apparatus of this invention is operable in the first, second, and third modes. When it is desired to process large-sized workpieces, the machining apparatus of this invention may be operated in the first mode. On the other hand, when it is desired to process small-sized workpieces, the machining apparatus of this invention may be operated alternately in the second and third modes.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A machining apparatus, comprising:
   a support frame including a first horizontal frame part, and a second horizontal frame part disposed above said first horizontal frame part;
   a first workbench mounted slidably on said first horizontal frame part of said support frame, and slidable relative to said support frame in a first horizontal direction;

a first operable unit mounted on said first horizontal frame part of said support frame, coupled to said first workbench, and operable so as to move said first workbench in the first horizontal direction;

a second workbench separated from said first workbench, aligned with said first workbench in the first horizontal direction, mounted slidably on said first horizontal frame part of said support frame, and slidable relative to said support frame in the first horizontal direction;

a second operable unit mounted on said first horizontal frame part of said support frame, coupled to said second workbench, and operable so as to move said second workbench in the first horizontal direction;

a tool-mounting unit mounted slidably on said second horizontal frame part of said support frame, and slidable relative to said support frame in a second horizontal direction transverse to the first horizontal direction; and a third operable unit mounted on said second horizontal frame part of said support frame, coupled to said tool-mounting unit, and operable so as to move said tool-mounting unit in the second horizontal direction;

wherein said first operable unit includes
- a screw rod that is mounted rotatably on said first horizontal frame part of said support frame, that extends in the first horizontal direction, and that is rotatable relative to said support frame in opposite first and second rotational directions,
- a motor that is coupled to said screw rod, and that is operable so as to drive rotation of said screw rod in the first and second rotational directions, and
- a non-rotatable mounting seat that is coupled threadedly to said screw rod, and that moves in the first horizontal direction toward said second workbench when said screw rod is rotated in the first rotational direction, and away from said second workbench when said screw rod is rotated in the second rotational direction;

wherein said first workbench is connected to said mounting seat of said first operable unit so as to be co-movable therewith in the first horizontal direction;

wherein said second operable unit includes
- a screw rod that is mounted rotatably on said first horizontal frame part of said support frame, that is parallel to said screw rod of said first operable unit, and that is rotatable relative to said support frame in the first and second rotational directions, said screw rods of said first and second operable units having parts that are spaced apart from each other in the second horizontal direction,
- a motor that is coupled to said screw rod of said second operable unit, and that is operable so as to drive rotation of said screw rod of said second operable unit in the first and second rotational directions, and
- a non-rotatable mounting seat that is coupled threadedly to said screw rod of said second operable unit, and that moves in the first horizontal direction toward said first workbench when said screw rod of said second operable unit is rotated in the first rotational direction, and away from said first workbench when said screw rod of said second operable unit is rotated in the second rotational direction;

wherein said second workbench is connected to said mounting seat of said second operable unit so as to be co-movable therewith in the first horizontal direction; and wherein there is an area wherein said screw rod of said first operable unit and said screw rod of said second operable unit are co-extensive in the first horizontal direction.

2. The machining apparatus as claimed in claim 1, further comprising a pair of spaced apart guide rails, each of which is mounted on said first horizontal frame part of said support frame, said first workbench being mounted slidably on said guide rails, said second workbench being mounted slidably on said guide rails.

3. The machining apparatus as claimed in claim 1, further comprising a pair of spaced apart guide rails, each of which is mounted on said second horizontal frame part of said support frame, said tool-mounting unit being mounted slidably on said guide rails.

* * * * *